United States Patent
Maki

(10) Patent No.: US 10,208,524 B2
(45) Date of Patent: Feb. 19, 2019

(54) MACHINE TOOL SYSTEM

(71) Applicant: FANUC CORPORATION, Yamanashi (JP)

(72) Inventor: Susumu Maki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 138 days.

(21) Appl. No.: 15/477,399

(22) Filed: Apr. 3, 2017

(65) Prior Publication Data
US 2017/0284146 A1    Oct. 5, 2017

(30) Foreign Application Priority Data

Apr. 5, 2016  (JP) .................................. 2016-076034

(51) Int. Cl.
*B23Q 7/00*  (2006.01)
*E05F 15/70*  (2015.01)
(Continued)

(52) U.S. Cl.
CPC ................ *E05F 15/70* (2015.01); *B23Q 7/04* (2013.01); *B23Q 11/0891* (2013.01);
(Continued)

(58) Field of Classification Search
USPC .................................................. 700/245–264
See application file for complete search history.

(56) References Cited

U.S. PATENT DOCUMENTS 4,842,455 A * 6/1989 Winkler .................... F16P 1/02
                                                                  409/134
5,318,195 A * 6/1994 Kahanek ............... G07F 11/045
                                                                  221/152
(Continued)

FOREIGN PATENT DOCUMENTS

JP           7116978 A        5/1995
JP       2010-228063 A       10/2010
(Continued)

OTHER PUBLICATIONS

English Abstract (JP 2006-075916) and Machine Translation for Japanese Publication No. 4629392 B2, published Nov. 19, 2010, 9 pgs.

(Continued)

*Primary Examiner* — Jonathan L Sample
(74) *Attorney, Agent, or Firm* — Fredrikson & Byron, P.A.

(57) ABSTRACT

A machine tool system includes: a machine tool that includes an openable door configured to block an opening of a cover surrounding the machine tool, and a door driving unit configured to open and close the door; and a work exchange device configured to exchange a work disposed in the cover. Further, the machine tool system includes: a first opening width setting unit configured to set a door opening width of the door; a second opening width setting unit configured to set a turnback opening width; and a door control unit configured to control the door driving unit to move the door in an opening direction from a completely closed position of the door to a position of the turnback opening width of the door, then move the door in a closing direction and stop the door at a position of the door opening width.

6 Claims, 12 Drawing Sheets

(51) Int. Cl.
*E05F 15/632* (2015.01)
*B23Q 7/04* (2006.01)
*B23Q 11/08* (2006.01)
*F16P 3/00* (2006.01)

(52) U.S. Cl.
CPC .............. *E05F 15/632* (2015.01); *F16P 3/00* (2013.01); *B23Q 2707/04* (2013.01); *E05Y 2201/434* (2013.01); *E05Y 2400/36* (2013.01); *E05Y 2900/608* (2013.01)

(56) References Cited

U.S. PATENT DOCUMENTS

| | | | | | |
|---|---|---|---|---|---|
| 5,871,312 | A | * | 2/1999 | Haninger | B23Q 11/085 144/285 |
| 6,113,343 | A | * | 9/2000 | Goldenberg | B25J 5/005 239/587.2 |
| 6,316,892 | B1 | * | 11/2001 | Valencia | E05F 15/632 318/293 |
| 7,585,016 | B2 | * | 9/2009 | Wehrenberg | B60J 5/0487 160/187 |
| 2004/0013498 | A1 | * | 1/2004 | Soucy | H01L 21/67772 414/217 |
| 2004/0047093 | A1 | * | 3/2004 | Yokomori | E05F 15/70 361/51 |
| 2004/0189046 | A1 | * | 9/2004 | Kawanobe | E05F 15/646 296/155 |
| 2006/0066147 | A1 | * | 3/2006 | Ohta | E05F 15/40 307/10.1 |
| 2006/0194682 | A1 | * | 8/2006 | Sugata | B23Q 1/626 483/3 |
| 2009/0100758 | A1 | * | 4/2009 | Nagakura | E05F 17/00 49/334 |
| 2010/0032105 | A1 | * | 2/2010 | Drifka | E06B 9/13 160/8 |
| 2014/0318019 | A1 | * | 10/2014 | Tsuchida | B23Q 11/0825 49/413 |
| 2017/0113761 | A1 | * | 4/2017 | Green | B63B 3/14 |
| 2017/0269569 | A1 | * | 9/2017 | Ogawa | B23Q 7/04 |
| 2017/0284146 | A1 | * | 10/2017 | Maki | E05F 15/632 |

FOREIGN PATENT DOCUMENTS

| | | |
|---|---|---|
| JP | 4629392 B2 | 11/2010 |
| JP | 2014205231 A | 10/2014 |

OTHER PUBLICATIONS

English Abstract and Machine Translation for Japanese Publication No. 2010-228063 A, published Oct. 14, 2010, 9 pgs.
Untranslated Decision to Grant a Patent mailed by Japan Patent Office (JPO) for Application No. JP 2016-076034, dated Jun. 12, 2018, 3 pages.
English machine transltion of Decision to Grant a Patent mailed by Japan Patent Office (JPO) for Application No. JP 2016-076034 dated Jun. 12, 2018, 3 pages.
Untranslated Notification of Reasons for Refusal mailed by Japan Patent Office (JPO) for Application No. JP 2016-076034, dated Apr. 3, 2018, 3 pages.
Translated Notification of Reasons for Refusal mailed by Japan Patent Office (JPO) for Application No. JP 2016-076034, dated Apr. 3, 2018, 3 pages.
English Abstract and Machine Translation for Japanese Publication No. 2014-205231 A, published Oct. 30, 2014, 11 pgs.
English Abstract and Machine Translation for Japanese Publication No. 07-116978 A, published May 9, 1995, 10 pgs.

* cited by examiner

FIG. 8

| ASSOCIATION CODE | DOOR OPENING WIDTH | TURNBACK OPENING WIDTH |
|---|---|---|
| D1 | IDa1 300.0 | IDb1 400.0 |
| D2 | IDa2 400.0 | IDb2 500.0 |
| D3 | IDa3 500.0 | IDb3 600.0 |

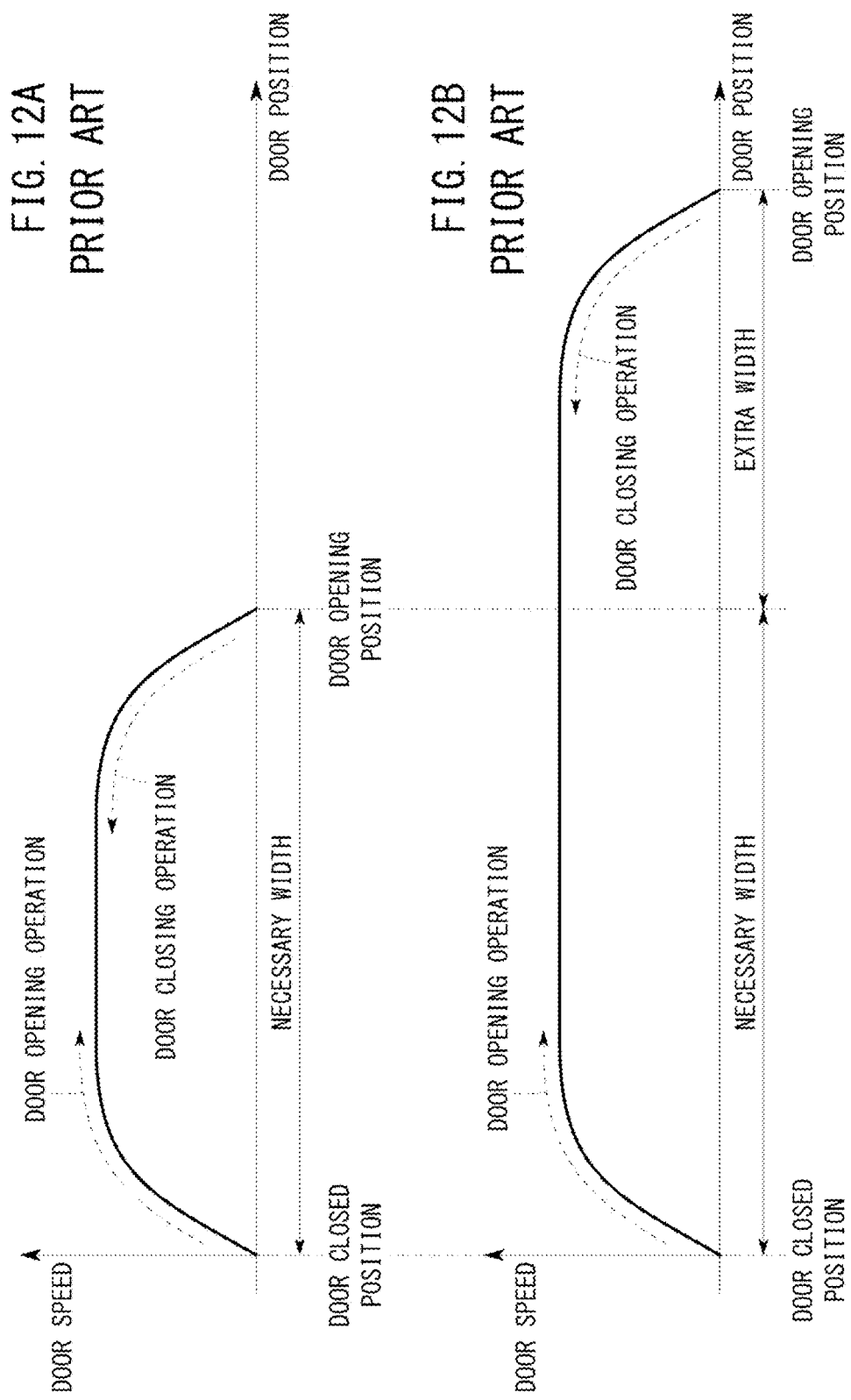

MACHINE TOOL SYSTEM

CROSS-REFERENCE TO RELATED APPLICATION

This application is based upon and claims the benefit of priority from Japanese Patent Application No. 2016-076034 filed on Apr. 5, 2016, the contents of which are incorporated herein by reference.

BACKGROUND OF THE INVENTION

Field of the Invention

The present invention relates to a machine tool system that opens and closes a door to exchange a work of a machine tool.

Description of the Related Art

It is demanded to automate manufacturing at a higher speed to manufacture products at lower cost. There is a processing automation system that uses a machine tool to meet this demand. This automation system not only automatically processes a work but also exchanges the work (attaches an unprocessed work and delivers a processed work). The work is exchanged by a work exchange device. Further, it is necessary to perform an operation of covering a machine tool with a cover and closing a door to prevent scattering of chips and a cutting fluid, and opening the door to enable movement of the work exchange device to an inside of the cover during exchange of a work, and the door is also automatically opened and closed. Although there is a case where a fluid pressure cylinder that uses a hydraulic pressure and air is used to open and close the door, it is difficult to control a position and a speed, and therefore it is difficult to lower a speed immediately before a door stop position and accurately stop the door at an arbitrary position.

Japanese Patent No. 4629392 discloses opening and closing a door at a high speed by using a servo motor and a ball screw. This is because it is possible to decelerate the door with the servo motor near an opening/closing end even when the door is moved at a high speed, and stop the door at the arbitrary position. Consequently, it is possible to reduce a shock at the opening/closing end and accelerate a speed to open and close the door by opening the door only by a necessary width. Consequently, it is possible to reduce a time taken to open and close the door, and reduce a cycle time.

Further, Japanese Laid-Open Patent Publication No. 2010-228063 (hereinafter referred to as "JP2010-228063A") relates to a door that is provided between a processing area (machining area) inside a machine tool and a standby area of a tool, but not a door (opening/closing door) that partitions an interior and an exterior of the machine tool. The invention therein reduces a processing time by eliminating a waste of an opening/closing time of the opening/closing door during exchange of the tool by changing a width by which the door is opened.

SUMMARY OF THE INVENTION

Thus, Japanese Patent No. 4629392 and JP2010-228063A disclose techniques of opening a door by a necessary width. However, it is necessary to gradually reduce a door movement speed to stop movement of the door. Therefore, as shown in FIG. 12A, when the door is opened by a necessary width (necessary width), the door decelerates before the door is opened by the necessary width, and a time to open the door becomes long. Hence, as shown in FIG. 12B, it is possible to prevent deceleration of the door before opening the door by the necessary width, by increasing the door opening width compared to the necessary width, and it is possible to reduce a time to open the door by the necessary width. However, the door is opened by an extra width corresponding to a difference (extra width) between the necessary width and the actual door opening width by which the door is opened and stops. Therefore, a distance from a position (door opening position) at which the door is opened and stops to a door completely closed position (door closing position) becomes long. Thus, an operation of closing the door takes time, and a door opening/closing time during exchange of works becomes long.

It is therefore an object of the present invention to provide a machine tool system that reduces a door opening/closing time during exchange of a work.

According to an aspect of the present invention, a machine tool system is provided and includes a machine tool including an openable door configured to block an opening of a cover surrounding the machine tool, and an electric motor configured to open and close the door, and a work exchange device configured to exchange a work disposed in the cover, and that includes a first opening width setting unit configured to set a door opening width of the door that is necessary to exchange the work, a second opening width setting unit configured to set a turnback opening width of the door that is wider than the door opening width, and a door control unit configured to, when the work exchange device exchanges the work, control the electric motor to move the door in an opening direction from a completely closed position of the door to a position of the turnback opening width of the door, then move the door in a closing direction and stop the door at a position of the door opening width.

According to this configuration, it is possible to shorten a door opening/closing time during exchange of the work while preventing interference between the door and the work exchange device. Consequently, it is possible to reduce the cycle time.

At least one of the first opening width setting unit, the second opening width setting unit and the door control unit may be provided to a control device of the machine tool.

At least one of the first opening width setting unit, the second opening width setting unit and the door control unit may be provided to a control device different from a control device of the machine tool.

The control device different from the control device of the machine tool may be a control device of the work exchange device.

The work exchange device includes a grip unit configured to grip the work, and a movement member configured to move the grip unit. Consequently, the work exchange device can exchange the work.

When the door moves in the opening direction to the position of the door opening width, the work exchange device drives the movement member and the grip unit at a stop position to exchange the work and then retract the grip unit to the stop position, and when the grip unit is retracted to a position at which the door, the movement member and the grip unit do not interfere with each other even though the door is moved to the completely closed position after exchanging the work, the door control unit controls the electric motor to move the door that stops at the position of the door opening width in the closing direction and close the door. Consequently, it is possible to reduce the cycle time while preventing interference between the door and the work exchange device.

According to the present invention, it is possible to shorten a door opening/closing time during exchange of the work while preventing the interference between the door and the work exchange device. Consequently, it is possible to reduce the cycle time.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a view showing an input example of door opening widths and turnback opening widths of a data input unit shown in FIG. 6;

FIGS. 12A and 12B are views for explaining a problem to be solved by the present invention.

DESCRIPTION OF THE PREFERRED EMBODIMENTS

A preferred embodiment of a machine tool system according to the present invention will be described in detail below with reference to the accompanying drawings.

Figure 1:
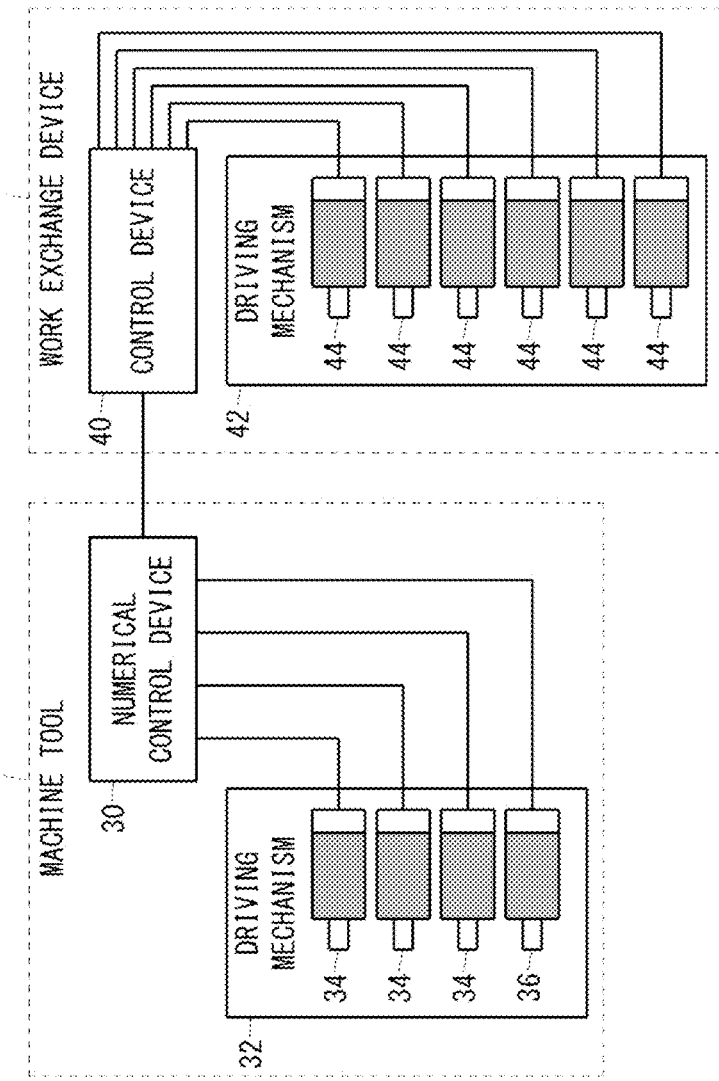
FIG. 1 is a configuration diagram showing a configuration of a machine tool system according to an embodiment.

FIG. 1 is a configuration diagram (functional block diagram) showing a configuration of a machine tool system 10 according to the embodiment. The machine tool system 10 includes a machine tool 12 and a work exchange device 14. The machine tool 12 machines or processes a work W (see FIGS. 3A to 3C). The machine tool 12 processes the work W disposed on a table Ta (see FIGS. 3A to 3C). The work exchange device 14 takes out the work (processed work) W that the machine tool 12 has finished processing, and disposes (places) an unprocessed work W on the table Ta. That is, the work exchange device 14 exchanges the work(s) W to be processed by the machine tool 12.

Figure 2A:
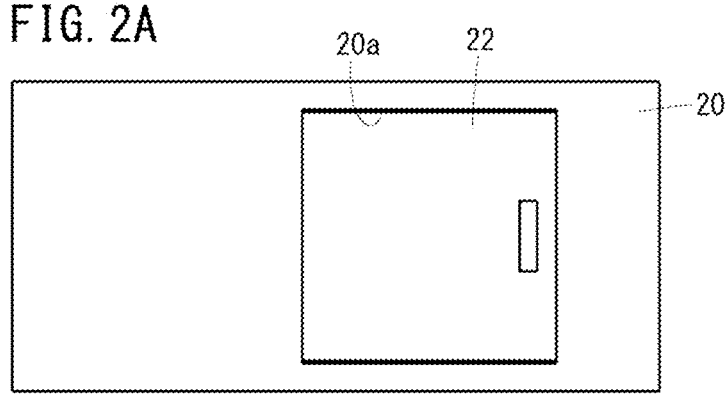
FIG. 2A is a view showing an example of a door state where a door position is in a door interference area.
Figure 2B:
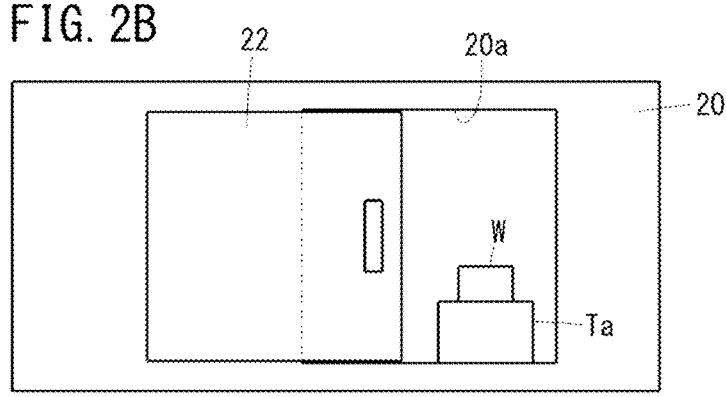
FIG. 2B is a view showing a door state where the door position is at a door interference boundary position.
Figure 2C:
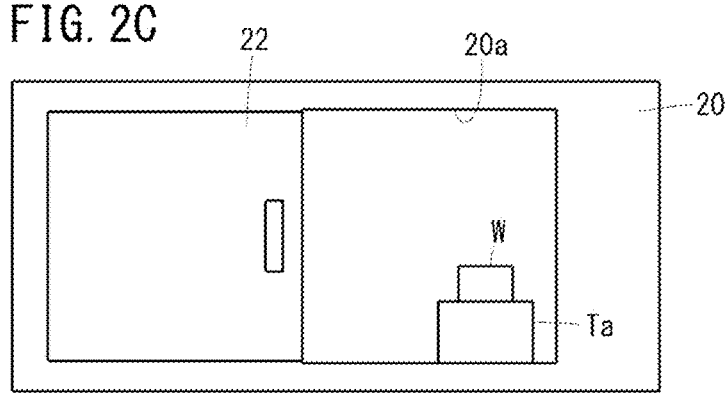
FIG. 2C is a view showing an example of a door state where the door position is in a door noninterference area.
Figure 3A:
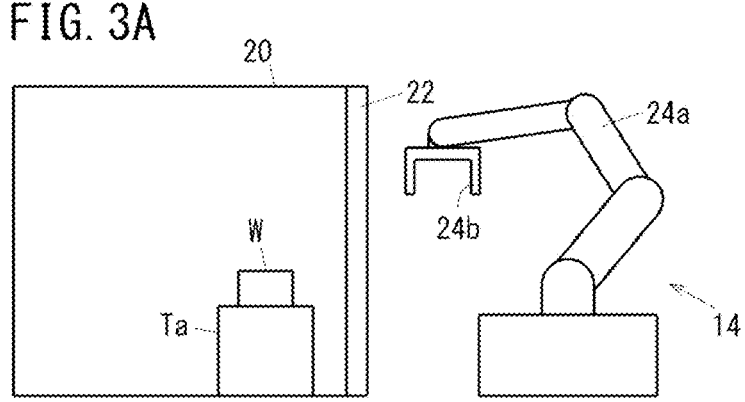
FIG. 3A is a view showing an example of a state of a machine tool where an operation position of the machine tool is in a work exchange device noninterference area.
Figure 3B:
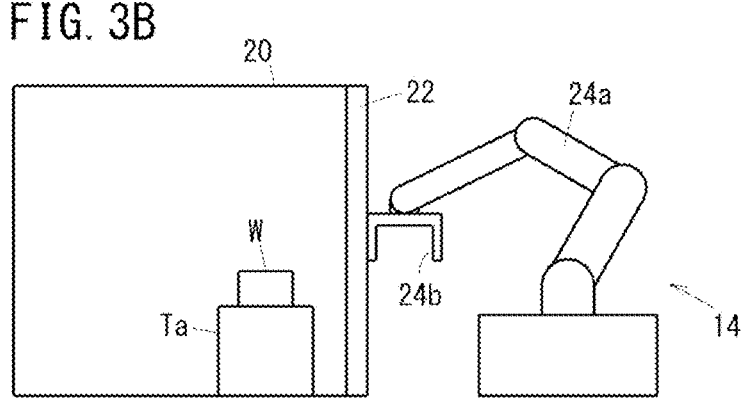
FIG. 3B is a view showing a state of the machine tool where the operation position of the machine tool is at a work exchange device interference boundary position.
Figure 3C:
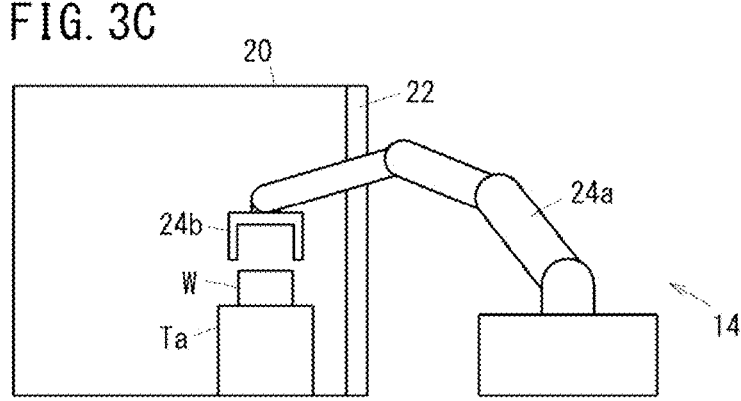
FIG. 3C is a view showing an example of a state where the operation position of the tool machine is in the work exchange device interference area.

As shown in FIGS. 2A to 2C, the machine tool 12 is surrounded by a cover 20 including an opening 20a, and the cover 20 is provided with an openable door 22 that blocks the opening 20a of the cover 20. This cover 20 is a cover that prevents a cutting fluid used to process the work W and chips (cut chips) from scattering to the surrounding during processing of the work W by the machine tool 12. The machine tool 12 closes the door 22 to block the opening 20a of the cover 20 during processing as shown in FIG. 2A. It is necessary to take out the processed work W disposed in the cover 20 and dispose the unprocessed work W in the cover 20 during exchange of the works W. Therefore, as shown in FIG. 2B or 2C, the door 22 is opened by a desired opening width and then the work exchange device 14 exchanges the works W. Further, as shown in FIGS. 3A to 3C, the work W is exchanged by an arm 24a of the work exchange device 14 and a grip unit 24b that grips the work W. That is, this arm 24a extends into the cover 20 through the opening 20a opened by the door 22, and then the grip unit 24b grips the work W, so that the work W is exchanged. This arm 24a is a movable member that moves the grip unit 24b. This grip unit 24b grips the processed work W placed on the table Ta, and places the unprocessed work W on the table Ta by releasing the grip on the unprocessed work W.

In this regard, a position of the door 22 at which the door 22 is completely closed (a state shown in FIG. 2A), i.e., a position of the door 22 at which an opening width of the door 22 is minimum (0) is a completely closed position. Further, a position of the door 22 at which the door 22 is completely opened (a state shown in FIG. 2C), i.e., the position of the door 22 at which the opening width of the door 22 is maximum is a completely opened position. Furthermore, a position at which the door 22 is opened and stops is a door opening stop position. This door opening stop position is a position in a range from the completely closed position to the completely opened position. In this regard, there is not a case where the door opening stop position equals to (or becomes) the completely opened position, or the door opening stop position equals to (or becomes) the completely closed position.

Further, a range (area) of the position of the door 22 where the door 22 and the work exchange device 14 (more specifically, at least one of the arm 24a and the grip unit 24b) interfere with each other when the work exchange device 14 operates in a work exchanging operation range, is referred to as a door interference area (e.g., the state shown in FIG. 2A). Furthermore, a range (area) of the position of the door 22 where the door 22 and the work exchange device 14 (more specifically, the arm 24a and the grip unit 24b) do not interfere with each other even when the work exchange device 14 performs any operation in the work exchanging operation range, is referred to as a door noninterference area (e.g., the state shown in FIG. 2C). Still further, the position of the door 22 at a boundary between the door interference area and the door noninterference area is referred to as a door interference boundary area (a state shown in FIG. 2B). That is, when moving closer to a right direction (closing direction) than the door interference boundary position shown in FIG. 2B, the position of the door 22 is in the door interference area, and when moving closer to a left direction (opening direction) than the door interference boundary position shown in FIG. 2B, the position of the door 22 is in the door noninterference area. When the door 22 is opened at this door interference boundary position, the works W can be exchanged, and this door interference boundary position is set by an operator (user).

Further, a range (area) of an operation position of the work exchange device 14 where the door 22 and the work exchange device 14 (more specifically, the arm 24a and the grip unit 24b) do not interfere with each other even when the door 22 performs any operation (movement) in an operation range, is referred to as a work exchange device noninterference area (e.g., a state shown in FIG. 3A). In this regard, the operation position of the work exchange device 14 (more specifically, the arm 24a and the grip unit 24b) shown in FIG. 3A is a stop position (retraction position). A range (area) of the operation position of the work exchange device 14 where the door 22 and the work exchange device 14 (more specifically, at least one of the arm 24a and the grip unit 24b) interfere with each other when the door 22 operates in the operation range, is referred to as a work exchange device interference area (e.g., a state shown in FIG. 3C). Further, the operation position of the work exchange device 14 at a boundary between the work exchange device interference area and the work exchange device noninterference area is a work exchange device interference boundary position (a state shown in FIG. 3B). That is, when operating from the work exchange device interference boundary position shown in FIG. 3B to the stop position, the work exchange device 14 is in the work exchange device noninterference area, and when operating in the work exchange device interference boundary position shown in FIG. 3B to exchange works, the work exchange device 14 is in the work exchange device interference area. In this regard, FIGS. 3A to 3C are side cross-sectional views of the cover 20 shown in FIGS. 2A to 2C.

Back to explanation of FIG. 1, the machine tool 12 includes a numerical control device (control device) 30 and a driving mechanism 32. The driving mechanism 32 includes a plurality of processing axis driving units 34 that drive a plurality of processing axes of the machine tool 12 that are not shown, and a door driving unit 36 that opens and closes the door 22. The plurality of processing axis driving units 34 and the door driving unit 36 are composed of electric motors such as servo motors. The numerical control device 30 processes the work (processing target) W by controlling the plurality of processing axis driving units 34. Further, the numerical control device 30 opens and closes the door 22 by controlling the door driving unit 36 (see FIGS. 2A to 2C). In this regard, the numerical control device 30 drives the plurality of processing axis driving units 34 and the door driving unit 36 according to processing programs or machining programs stored in a storage medium that is not shown.

The work exchange device 14 includes a control device 40 and a driving mechanism 42. The driving mechanism 42 includes a plurality of driving units 44 that drive a plurality of driving axes (e.g., driving axes of the arm 24a and the grip unit 24b) of the work exchange device 14 that are not shown. The plurality of driving units 44 are composed of electric motors such as servo motors. The control device 40 moves the arm 24a and the grip unit 24b by controlling the plurality of driving units 44 to exchange the works W. That is, the control device 40 takes out the work W (processed work W) that the machine tool 12 has finished processing, and disposes the unprocessed work W on the table Ta. This numerical control device 30 and the control device 40 can communicate with each other. This communication may be performed by cables or by radio. In this regard, the control device 40 drives the plurality of driving units 44 according to programs stored in the storage medium that is not shown.

In order to shorten an opening/closing time of the door 22 and reduce a cycle time, it is necessary to shorten a total time of a time to move the door 22 from the completely closed position to the door interference boundary position, and a time to move the door 22 from the door opening stop position at which the door 22 is opened and stops, to the completely closed position. In this regard, the machine tool 12 moves the door 22 in an opening direction and opens the door 22 for exchange of the works W, and the work exchange device 14 starts an exchanging operation of the works W when the door 22 moves to the door interference boundary position. Further, the machine tool 12 moves the door 22 to the completely closed position and closes the door 22 when the operation position of the work exchange device 14 reaches the work exchange device interference boundary position after exchange of the works W. Hence, the work exchange device 14 exchanges the works W from the time the door 22 moving in at least the opening direction passes the door interference boundary position until the time the door 22 stops, and therefore this time is not included in the opening/closing time of the door 22. That is, the opening/closing time of the door 22 according to the present embodiment is a time during which only the door 22 is moving to exchange the works W.

As described above, when the door 22 is opened by the door opening width (a distance from the completely closed position to the door interference boundary position) that is necessary to exchange the works W, the door 22 decelerates before the door 22 is opened by the door opening width, and therefore the opening/closing time of the door 22 in exchanging the works W becomes long (see FIG. 12A). Further, by making a width by which the door 22 is opened wider than the door opening width, it is possible to prevent deceleration of the door 22 before the door 22 is opened by the door opening width. However, the door 22 is opened by an extra width corresponding to a difference (extra width) between the opening width of the door 22 by which the door 22 is opened and stops and the door opening width, and therefore it takes time to close the door 22 at the completely closed position (see FIG. 12B).

Figure 4:
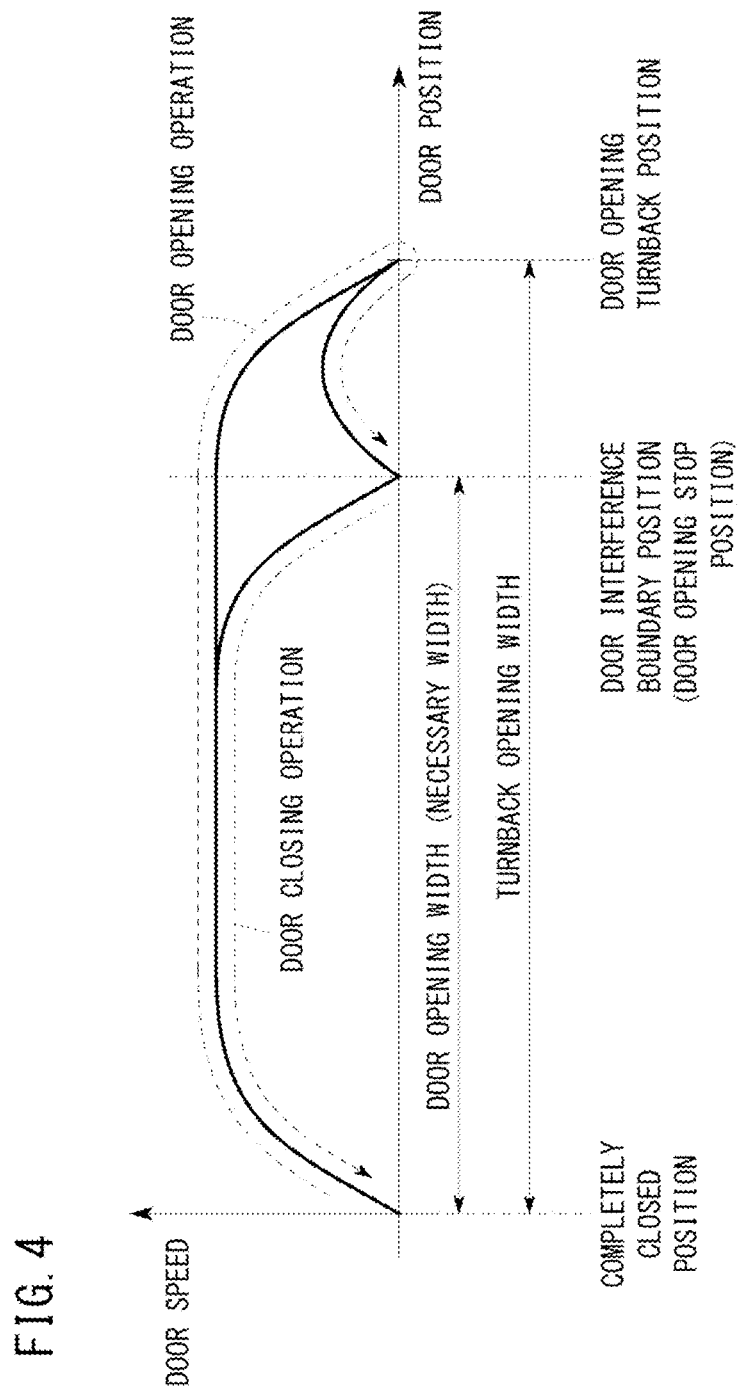
FIG. 4 is a view for explaining a door opening/closing operation according to the embodiment.

Hence, as shown in FIG. 4, when the door 22 is opened in the opening direction to exchange the works W, the door 22 is opened by a turnback opening width that is wider than the door opening width, and then the door 22 is moved in the closing direction and stopped at a position of the door opening width while the work exchange device 14 exchanges the works W. Consequently, it is possible to shorten the time to close the door 22 at the completely closed position after exchange of the works W. Hence, the position of the door opening width (the position of the door 22 at which the door 22 is opened by the door opening width) is the door opening stop position, and the door opening stop position equals to (or becomes) the door interference boundary position. In this regard, the position of this turnback opening width (the position of the door 22 at which the door 22 is opened by the turnback opening width) is referred to as a door opening turnback position. This turnback opening width is a distance equal to or less than a maximum opening width of the door 22. Hence, the door opening turnback position is the completely opened position or a position closer to a side of the completely closed position than the completely opened position. In this regard, fundamentally, although the door 22 moves at a predetermined movement speed (a certain move speed), the movement speed of the door 22 gradually accelerates at a time of start of movement and gradually decelerates at a time of stop.

Figure 5:
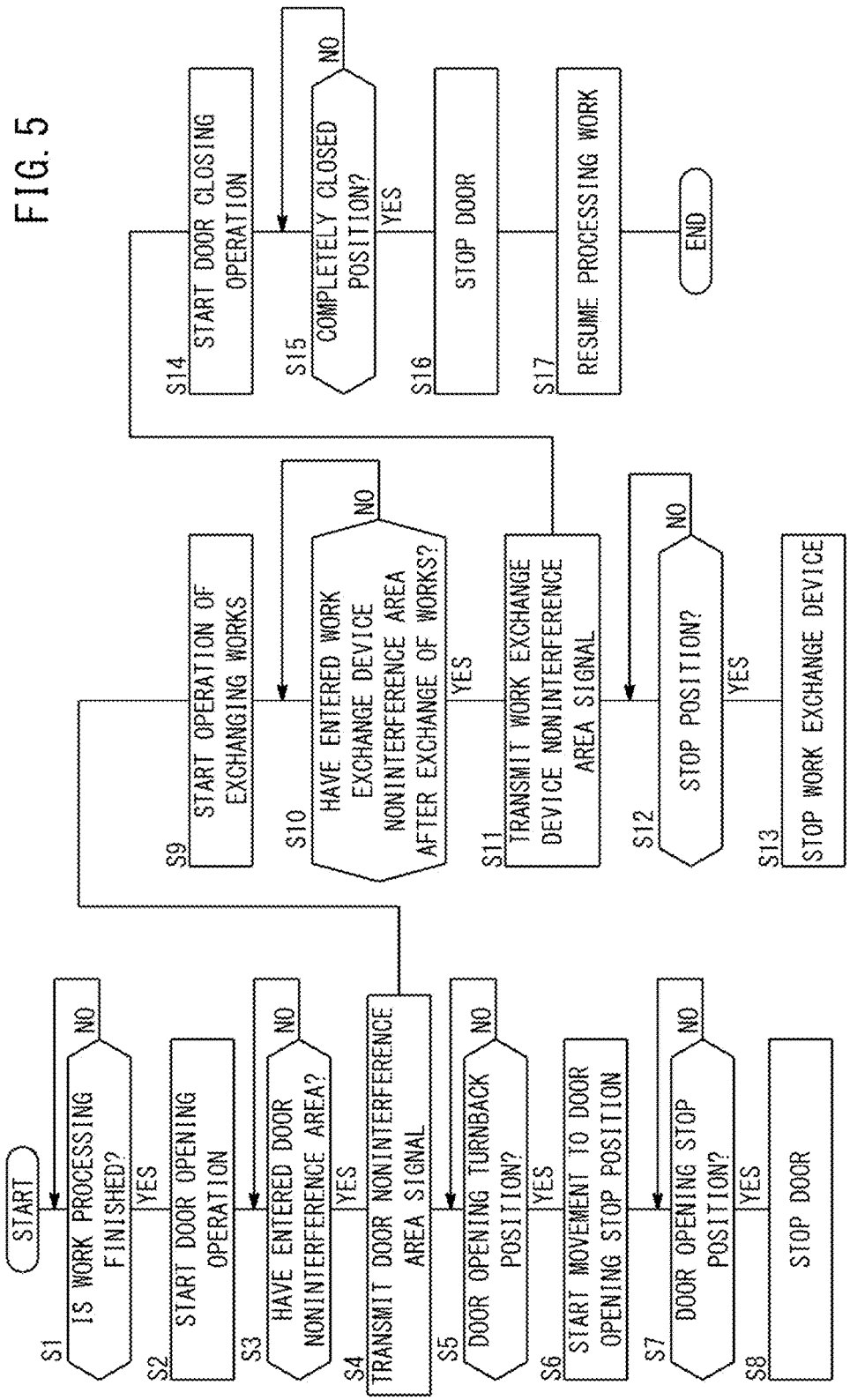
FIG. 5 is a flowchart showing an entire operation of a machine tool system (a machine tool and a work exchange device) shown in FIG. 1.

Next, an entire operation of the machine tool system 10 (the machine tool 12 and the work exchange device 14) will be described with reference to a flowchart shown in FIG. 5. First, in step S1, the numerical control device 30 of the machine tool 12 determines whether or not processing the work W has been finished. More specifically, the numerical control device 30 determines whether or not the processing has been finished based on the processing program.

When determining in step S1 that processing the work W has been finished, the flow moves to step S2, and the numerical control device 30 starts a door opening operation by controlling the door driving unit 36. More specifically, the numerical control device 30 starts the door opening operation of moving the door 22 in the opening direction from the completely closed position to the door opening turnback position, then moving the door 22 in the closing direction and stopping the door 22 at the door opening stop position.

Next, in step S3, the numerical control device 30 determines whether the position of the door 22 has entered the door noninterference area or has reached the door interference boundary position. More specifically, the numerical control device 30 performs this determination based on a detection signal (a detection signal indicating a movement amount of the door 22) from an encoder that is provided to the door driving unit 36 and is not shown. This door interference boundary position is uniquely determined based on the door opening width set by the operator. It is necessary to start an exchanging operation of the work exchange device 14 after opening the door 22 at or beyond the door interference boundary position to prevent interference between the door 22 and the work exchange device 14 during exchange of the works W. This door interference boundary position varies according to a type of the work W, a size of the work W or the operation area of the work exchange device 14. Further, the door opening width is preferably as narrow as possible to reduce the cycle time. Hence, the operator sets a width (distance) from the completely closed position of the door 22 to the door interference boundary position as the door opening width. That is, the door opening width is information indicating a distance (width) from the completely closed position of the door 22 to the door interference boundary position of the door 22, and is an opening width (necessary width) of the door 22 that is necessary to exchange the works W. In this regard, the operator may set a slightly wider door opening width than an actual door interference boundary position to reduce a risk of interference between the door 22 and the work exchange device 14 (at least one of the arm 24a and the grip unit 24b).

When it is determined in step S3 that the position of the door 22 has not entered the door noninterference area or has not reached the door interference boundary position, the flow remains in step S3 until it is determined that the position of the door 22 has entered the door noninterference area or has reached the door interference boundary position. Further, when it is determined in step S3 that the position of the door 22 has entered the door noninterference area or has reached the door interference boundary position, the flow moves to step S4 and the numerical control device 30 transmits a door noninterference area signal (work exchange start signal) to the control device 40 of the work exchange device 14.

Next, in step S5, the numerical control device 30 determines whether or not the door 22 has moved to the door opening turnback position. More specifically, the numerical control device 30 performs this determination based on the detection signal (the detection signal indicating the movement amount of the door 22) from the encoder that is not shown and is provided to the door driving unit 36. This door opening turnback position is uniquely determined based on the turnback opening width set by the operator. This turnback opening width is information indicating the width (distance) from the completely closed position of the door 22 to the door opening turnback position. This turnback opening width is a width wider than the door opening width. Operator's settings of the door opening width and the turnback opening width will be described in detail below.

When it is determined in step S5 that the door 22 has not moved to the door opening turnback position, the flow remains in step S5 until it is determined that the door 22 has moved to the door opening turnback position. Meanwhile, when it is determined in step S5 that the door 22 has moved to the door opening turnback position, the flow moves to step S6, and the numerical control device 30 starts moving the door 22 to the door opening stop position by controlling the door driving unit 36. The door opening stop position is closer to a side of the completely closed position than the door opening turnback position, and therefore an operation in step S6 causes the door 22 to temporarily stop at the door opening turnback position and then move in the closing direction.

Next, in step S7, the numerical control device 30 determines whether or not the door 22 has moved to the door opening stop position (door interference boundary position). More specifically, the numerical control device 30 performs this determination based on the detection signal (the detection signal indicating the movement amount of the door 22) from the encoder that is provided to the door driving unit 36. When it is determined in step S7 that the door 22 has not moved to the door opening stop position, the flow remains in step S7, and when it is determined that the door 22 has moved to the door opening stop position, the flow moves to step S8. When the flow moves to step S8, the numerical control device 30 stops the movement of the door 22 by controlling the door driving unit 36. Thus, the door 22 stops at the door opening stop position (door interference boundary position).

When receiving the door noninterference area signal (work exchange start signal) transmitted from the numerical control device 30 of the machine tool 12 in step S4, the control device 40 of the work exchange device 14 starts the operation of exchanging the works W in step S9. The control device 40 starts the operation of exchanging the works W by controlling the plurality of driving units 44. After this exchanging operation starts, the arm 24a and the grip unit 24b at the stop position (retraction position) (the state shown in FIG. 3A) perform an operation of moving toward the work W disposed in the cover 20, exchanging the works W and then turning back (retracting) to the stop position.

Next, the flow moves to step S10, and after the works W are exchanged, the control device 40 determines whether the operation position of the work exchange device 14 (the arm 24a and the grip unit 24b) has entered the work exchange device noninterference area or has reached the work exchange device interference boundary position. More specifically, the control device 40 calculates operation positions of the arm 24a and the grip unit 24b based on detection signals from encoders that are not shown and are provided to the plurality of driving units 44, respectively. Further, the control device 40 determines whether the calculated operation positions of the arm 24a and the grip unit 24b have entered the work exchange device noninterference area or have reached the work exchange device interference boundary position. In this regard, position information of this work exchange device interference boundary position is stored in the storage medium of the control device 40 that is not shown, and this determination is performed based on this position information. When NO is determined in step S10, the flow remains in step S10 until YES is determined. Further, when YES is determined in step S10 (i.e., when it is determined that the operation position of the work exchange device 14 (the arm 24a and the grip unit 24b) has entered the work exchange device noninterference area or has reached the work exchange device interference boundary position after exchange of the works W), the flow moves to S11, and the control device 40 transmits the work exchange device noninterference area signal (door closing start signal) to the numerical control device 30 of the machine tool 12.

Next, in step S12, the control device 40 determines whether or not the work exchange device 14 (the arm 24a and the grip unit 24b) has moved (operated) to the stop position. More specifically, the control device 40 performs this determination based on the detection signals of the encoders that are provided to the plurality of driving units 44, respectively. When it is determined in step S12 that the work exchange device 14 (the arm 24a and the grip unit 24b) has not moved (operated) to the stop position, the flow remains in step S12. When it is determined that the work exchange device 14 has operated to the stop position, the flow moves to step S13. When the flow moves to step S13, the control device 40 stops the operation of the work exchange device 14 (the arm 24a and the grip unit 24b) by controlling the plurality of driving units 44.

When receiving the work exchange device noninterference area signal (door closing start signal) transmitted from the control device 40 of the work exchange device 14 in step S11, the numerical control device 30 of the machine tool 12 starts a door closing operation of closing the door 22 in step S14. The numerical control device 30 starts the door closing operation by controlling the door driving unit 36. Thus, the door 22 moves from the door opening stop position to the completely closed position.

Next, in step S15, the numerical control device 30 determines whether or not the door 22 has moved to the completely closed position. More specifically, the numerical control device 30 performs this determination based on the detection signal (the detection signal indicating the movement amount of the door 22) from the encoder that is provided to the door driving unit 36. When it is determined in step S15 that the door 22 has not moved to the completely closed position, the flow remains in step S15, and when it is determined that the door 22 has moved to the completely closed positon, the flow moves to step S16. When the flow moves to step S16, the numerical control device 30 stops the movement of the door 22. Further, in step S17, the numerical control device 30 controls the plurality of processing axis driving units 34, and starts processing the unprocessed work W exchanged by the work exchange device 14.

Figure 6:
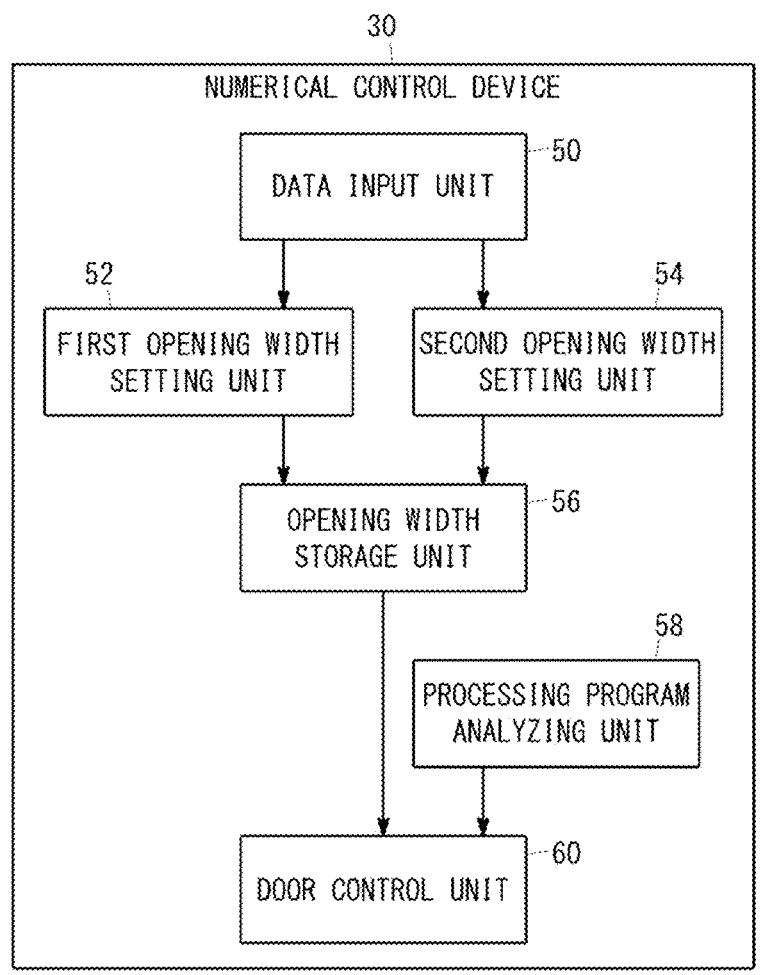
FIG. 6 is a configuration diagram showing a configuration of a numerical control device.
Figure 7:
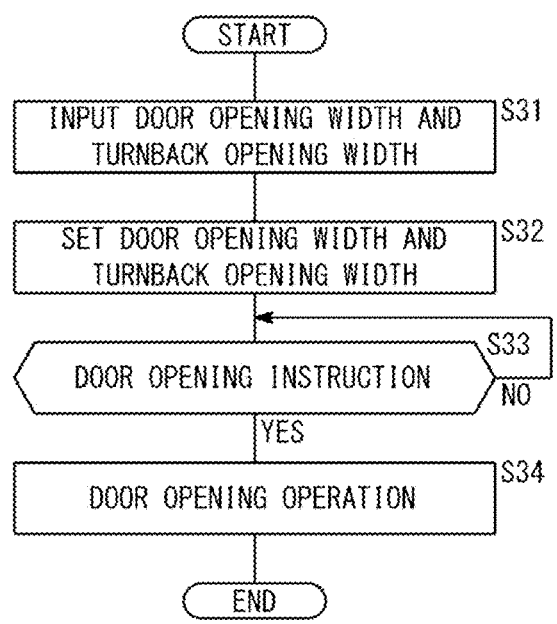
FIG. 7 is a flowchart showing an operation of the numerical control device shown in FIG. 6.

FIG. 6 is a configuration diagram (function block diagram) showing a configuration of the numerical control device 30. The numerical control device 30 includes a data input unit 50, a first opening width setting unit 52, a second opening width setting unit 54, an opening width storage unit 56, a processing program analyzing unit 58, and a door control unit 60. Further, FIG. 7 is a flowchart showing an operation of the numerical control device 30. A function and an operation of each unit of the numerical control device 30 will be described with reference to FIGS. 6 and 7.

In step S31, the data input unit 50 receives an input of the door opening width and the turnback opening width according to an operator's (user's) operation. The data input unit 50 is an interface that the operator uses to input data such as the door opening width and the turnback opening width, and may be a liquid crystal panel with a touch panel. In this case, the operator (user) can input data by touching a display surface by a finger. Further, the data input unit 50 may be a liquid crystal panel, a mouse and a keyboard. Consequently, the operator can input data by operating the mouse and the keyboard while looking at the display surface of the liquid crystal panel.

In step S32, the first opening width setting unit 52 sets the door opening width inputted by the data input unit 50, and the second opening width setting unit 54 sets the turnback opening width inputted by the data input unit 50. The door opening width set by this first opening width setting unit 52 and the turnback opening width set by the second opening width setting unit 54 are stored in the opening width storage unit 56. That is, the first opening width setting unit 52 and the second opening width setting unit 54 store the set door opening width and the set turnback opening width in the opening width storage unit 56.

FIG. 8 is a view showing an input example of the door opening width and the turnback opening width by the data input unit 50. A display surface of the data input unit 50 displays pluralities of (three in the present embodiment) first entry fields IDa (IDa1 to IDa3) and second entry fields IDb (IDb1 to IDb3) in which door opening widths and turnback opening widths associated with a plurality of association codes D (D1 to D3) can be inputted, respectively. The data input unit 50 inputs the door opening widths to the three first entry fields IDa (IDa1 to IDa3), respectively, and the turnback opening widths to the three second entry fields IDb (IDb1 to IDb3), respectively, according to an operator's operation (e.g., an operation of the touch panel or an operation of the keyboard or the mouse) (step S31).

The data input unit 50 may receive an input of coordinates as the door opening widths and the turnback opening widths or may receive an input of this width (distance). In the example shown in FIG. 8, "300.0" is inputted in the first entry field (IDa1) and "400.0" is inputted in the second entry field IDb1, associated with the association code D1. Further, "400.0" is inputted to the first entry field IDa2 and "500.0" is inputted in the second entry field IDb2, associated with the association code D2. Also, "500.0" is inputted in the first entry field IDa3 and "600.0" is inputted in the second entry field IDb3, associated with the association code D3.

Furthermore, when the operator inputs the door opening width and the turnback opening width and then pushes a setting button displayed on a screen that is not shown, the first opening width setting unit 52 and the second opening width setting unit 54 set pluralities of inputted door opening widths and turnback opening widths (step S32). More specifically, the first opening width setting unit 52 sets the three door opening widths inputted to the first entry fields IDa (IDa1 to IDa3), and the second opening width setting unit 54 sets the three turnback opening widths inputted to the second entry fields IDb (IDb1 to IDb3). In this case, the first opening width setting unit 52 and the second opening width setting unit 54 associate the plurality of set door opening widths (the plurality of door opening widths inputted in the first entry fields IDa) and the plurality of turnback opening widths (the plurality of turnback opening widths inputted to the plurality of second input entry fields IDb) with the plurality of association codes D (D1 to D3), respectively, to store in the opening width storage unit 56.

In this regard, when a difference (distance) between the set door opening width and turnback opening width, i.e., a difference (distance) between the door opening stop position and the door opening turnback position is too long, there is a probability that the door 22 has not yet reached the door opening stop position at a point of time at which the operation position of the work exchange device 14 that has exchanged the works W has entered the work exchange device noninterference area or has reached the work exchange device interference boundary position. Hence, the operator sets the turnback opening width such that the door 22 reaches the door open stop position by the point of time at which the operation position of the work exchange device 14 has entered the work exchange device noninterference area or has reached the work exchange device interference boundary position. In this regard, when the difference (distance) between the door opening width and the turnback opening width set by the operator is too long, and therefore the door 22 has not yet reached the door opening stop position at the point of time at which the operation position of the work exchange device 14 after exchanging the works W has entered the work exchange device noninterference area or has reached the work exchange device interference boundary position, the numerical control device 30 may move the door 22 to the completely closed position without stopping the door 22 at the door opening stop position.

Figure 9:
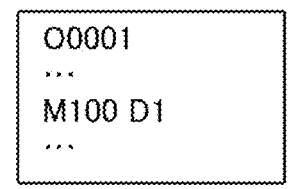
FIG. 9 is a view showing an example of a processing program.

The processing program analyzing unit 58 reads and analyzes the processing program. The processing program analyzing unit 58 determines whether or not a door opening instruction code (e.g., M100) has been detected by analyzing the processing program (step S33). The processing program analyzing unit 58 outputs a door opening instruction to the door control unit 60 when detecting the door opening instruction code. In the processing program, an association code D indicating which opening width of the pluralities of set door opening widths and turnback opening widths is used is also described along with the door opening instruction code. Hence, the processing program analyzing unit 58 also outputs the association code D, along with the door opening instruction to the door control unit 60. FIG. 9 is a view showing an example of the processing program. As is clear from FIG. 9, "M100 D1" is described in the processing program, and therefore the processing program analyzing unit 58 outputs the association code D1 along with the door opening instruction to the door control unit 60 when detecting the door opening instruction code "M100".

When the door opening instruction is sent from the processing program analyzing unit 58 (a branch to YES in step S33), the door control unit 60 performs an operation of opening the door 22 (step S34). The door control unit 60 controls the door driving unit 36 and opens the door 22. In this case, the door control unit 60 reads from the opening width storage unit 56 the door opening width and the turnback opening width associated with the association code D sent together with the door opening instruction from the processing program analyzing unit 58, and controls the door driving unit 36 based on the read door opening width and turnback opening width. That is, the door control unit 60 controls the door driving unit 36, moves the door 22 in the opening direction from the completely closed position of the door 22 to the position of the turnback opening width, then moves the door 22 in the closing direction and stops the door at the position of the door opening width. In the example shown in FIG. 9, the association code D described along with the door opening instruction code "M100" is D1, and, in the example shown in FIG. 8, the door opening width and the turnback opening width associated with the association code D1 are "300.0" and "400.0". Hence, the door control unit 60 controls the door driving unit 36 based on the door opening width "300.0" and the turnback opening width "400.0". In this regard, this door control unit 60 performs the operations in step S2 and step S5 to step S8 in FIG. 5, and performs the operations in step S14 to step S16, too.

[Modifications of Above Embodiment]

The above embodiment may be modified as follows.

Figure 10:
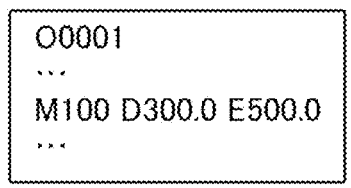
FIG. 10 is a view showing an example of a processing program according to a first modification.

(First Modification) In the first modification, the first opening width setting unit 52 and the second opening width setting unit 54 set a door opening width and a turnback opening width by incorporating the door opening width and the turnback opening width inputted in the processing program by the data input unit 50. FIG. 10 is a view showing an example of the processing program in which a door opening width and a turnback opening width are incorporated. As shown in FIG. 10, a door opening width instruction code "D300.0" and a turnback opening width instruction code "E500.0" are described along with the door opening instruction code "M100" in the processing program. This door opening width instruction code "300.0" is a door opening width set by the first opening width setting unit 52, and the turnback opening width instruction code "500.0" is a turnback opening width set by the second opening width setting unit 54. Further, when detecting the door opening instruction code "M100", the processing program analyzing unit 58 outputs the door opening instruction to the door control unit 60, and outputs the detected opening width and turnback opening width to the door control unit 60. When receiving the door opening instruction, the door opening width and the turnback opening width from the processing program analyzing unit 58, the door control unit 60 controls the door driving unit 36 based on the door opening width and the turnback opening width. Hence, the opening width storage unit 56 is unnecessary in the first modification.

(Second Modification) In the above embodiment and the first modification, the numerical control device 30 controls the door driving unit 36. However, the control device 40 of the work exchange device 14 may control the door driving unit 36. In this case, the control device 40 may determine (the operation in step S3) whether the position of the door 22 has entered the door noninterference area or has reached the door interference boundary position. Further, the numerical control device 30 may determine (the operation in step S10) whether the operation position of the work exchange device 14 has entered the work exchange device noninterference area or has reached the work exchange device interference boundary position. In this case, the work exchange device 14 outputs operation information of the work exchange device 14 to the numerical control device 30, and the position information of this work exchange device interference boundary position is stored in the storage medium of the numerical control device 30 that is not shown.

Figure 11:
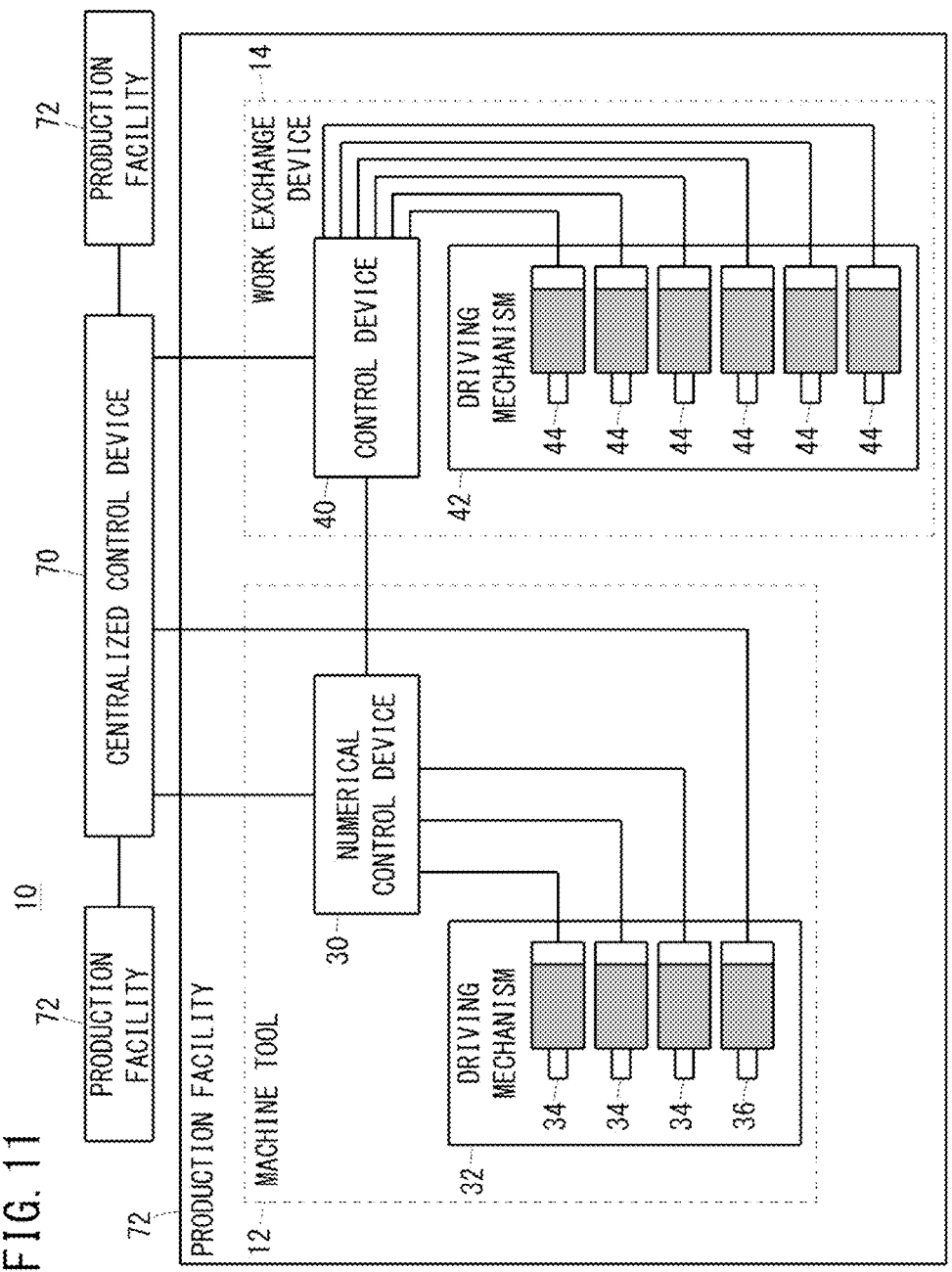
FIG. 11 is a configuration diagram showing a configuration of a machine tool system according to a third modification.

(Third Modification) In the above embodiment and the first modification, the numerical control device 30 controls the door driving unit 36. However, as shown in FIG. 11, a centralized control device 70 may control the door driving unit 36. This centralized control device 70 is a higher level control device that controls the numerical control device 30 and the control device 40 in an integrated manner. In this case, the centralized control device 70 may determine (the operation in step S3) whether the position of the door 22 has entered the door noninterference area or has reached the door interference boundary position. Further, the centralized control device 70 may determine (the operation in step S10) whether the operation position of the work exchange device 14 has entered the work exchange device noninterference area or has reached the work exchange device interference boundary position. In this case, the work exchange device 14 outputs the operation information of the work exchange device 14 to the centralized control device 70, and the position information of this work exchange device interference boundary position is stored in a storage medium of the centralized control device 70 that is not shown. This centralized control device 70 may control the numerical control devices 30 of the plurality of machine tools 12 and the control devices 40 of the plurality of work exchange devices 14. That is, as shown in FIG. 11, the centralized control device 70 may integrally control a plurality of production facilities 72 that include the machine tools 12 and the work exchange devices 14.

(Fourth Modification) At least one of the data input unit 50, the first opening width setting unit 52, the second opening width setting unit 54, the opening width storage unit 56, the processing program analyzing unit 58 and the door control unit 60 may be provided to a control device (e.g., the control device 40 of the work exchange device 14 or the centralized control device 70) other than the numerical control device 30.

(Fifth Modification) In the above embodiment and the first to fourth modifications, an example of a robot has been described as the work exchange device 14. However, the work exchange device 14 may be a loader. The loader also includes a grip unit that grips the work W, and a movement member that moves this grip unit.

As described above, the machine tool system 10 described in at least one of the embodiment and the first to fifth modifications includes the machine tool 12 that includes the openable door 22 that blocks the opening 20a of the cover 20 that surrounds the machine tool 12, and the door driving unit 36 that opens and closes the door 22, and the work exchange device 14 that exchanges the works W disposed in the cover 20. Further, the machine tool system 10 includes the first opening width setting unit 52 that sets a door opening width of the door 22 that is necessary to exchange the works W, the second opening width setting unit 54 that sets a turnback opening width of the door 22 that is wider than the door opening width, and the door control unit 60 that, when the work exchange device 14 exchanges the works W, controls the door driving unit 36 to move the door 22 in the opening direction from the completely closed position of the door 22 to a position of the turnback opening width of the door 22, then move the door 22 in the closing direction and stop the door 22 at a position of the door opening width.

Consequently, it is possible to shorten the opening/closing time of the door 22 during exchange of the works W while preventing interference between the door 22 and the work exchange device 14. Consequently, it is possible to reduce the cycle time.

At least one of the first opening width setting unit 52, the second opening width setting unit 54 and the door control unit 60 may be provided to the numerical control device 30 of the machine tool 12. Further, at least one of the first opening width setting unit 52, the second opening width setting unit 54 and the door control unit 60 may be provided to a control device different from the control device 30 of the machine tool 12. The control device different from the control device 30 of the machine tool 12 may be the control device 40 of the work exchange device 14 or may be the centralized control device 70.

The work exchange device 14 includes a grip unit (e.g., the grip unit 24b) that grips the work W, and a movement member (e.g., arm 24a) that moves the grip unit. Consequently, the work exchange device 14 can exchange the works W.

When the door 22 having moved in the opening direction moves to the position of the door opening width, the work exchange device 14 drives the movement member and the grip unit at a stop position to exchange the works W and then retract the grip unit to the stop position. When the grip unit is retracted to a position at which the door 22, the movement member and the grip unit do not interfere with each other even though the door 22 is moved to the completely closed position after the exchange of the works W, the door control unit 60 controls the door driving unit 36 to move the door 22 that stops at the position of the door opening width in the closing direction and close the door 22. Consequently, it is possible to reduce the cycle time while preventing interference between the door 22 and the work exchange device 14.

The machine tool system according to the present invention is not limited to the above described embodiments. It is a matter of course that variations and modifications can be adopted without deviating from the gist of the present invention.

What is claimed is:

1. A machine tool system comprising:
   a machine tool including an openable door configured to block an opening of a cover surrounding the machine tool, and an electric motor configured to open and close the door; and
   a work exchange device configured to exchange a work disposed in the cover,
      wherein the machine tool system further comprises:
      a first opening width setting unit configured to set a door opening width of the door that is necessary to exchange the work and is set by an operator;
      a second opening width setting unit configured to set a turnback opening width of the door that is wider than the door opening width and is set by an operator; and
      a door control unit configured to, when the work exchange device exchanges the work, control the electric motor to move the door in an opening direction from a completely closed position of the door to a position of the turnback opening width of the door, then move the door in a closing direction and stop the door at a position of the door opening width.

2. The machine tool system according to claim 1, wherein at least one of the first opening width setting unit, the second opening width setting unit and the door control unit is provided to a control device of the machine tool.

3. The machine tool system according to claim 1, wherein at least one of the first opening width setting unit, the second opening width setting unit and the door control unit is provided to a control device different from a control device of the machine tool.

4. The machine tool system according to claim 3, wherein the control device different from the control device of the machine tool is a control device of the work exchange device.

5. The machine tool system according to claim 1, wherein the work exchange device includes a grip unit configured to grip the work, and a movement member configured to move the grip unit.

6. The machine tool system according to claim 5, wherein:
   when the door moves in the opening direction to the position of the door opening width, the work exchange device drives the movement member and the grip unit at a stop position to exchange the work and then retract the grip unit to the stop position; and when the grip unit is retracted to a position at which the door, the movement member and the grip unit do not interfere with each other even though the door is moved to the completely closed position after exchanging the work, the door control unit controls the electric motor to move the door that stops at the position of the door opening width in the closing direction and close the door.

* * * * *